Oct. 28, 1924.
E. W. VOSE
TAIL LAMP FOR VEHICLES
Filed Oct. 24, 1922
1,513,300
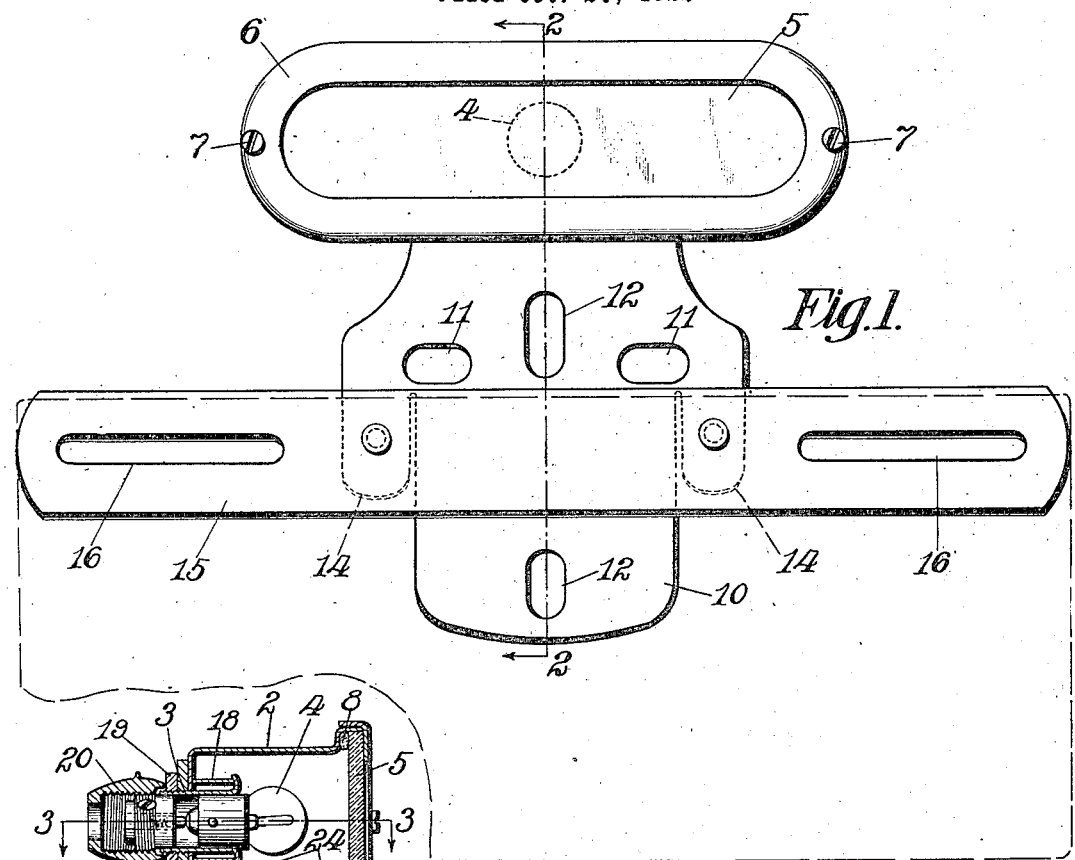
Fig. 1.
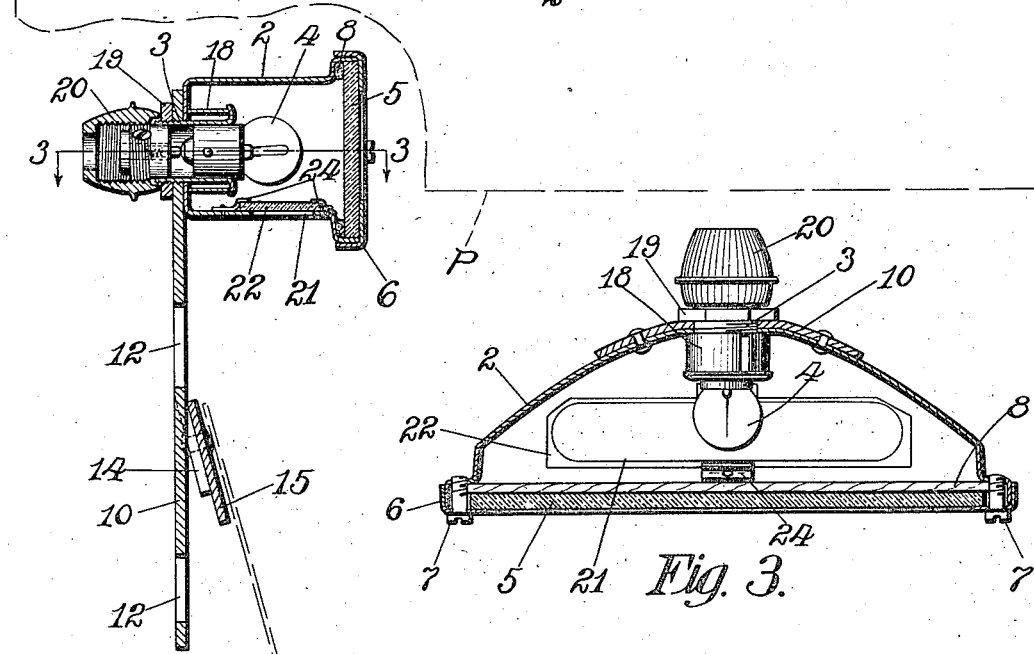
Fig. 2.   Fig. 3.
Fig. 4.
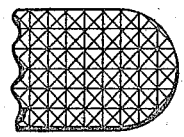
Inventor.
Edwin W. Vose
by J. H. McCrody
his atty.

Patented Oct. 28, 1924.

1,513,300

UNITED STATES PATENT OFFICE.

EDWIN W. VOSE, OF BEVERLY, MASSACHUSETTS.

TAIL LAMP FOR VEHICLES.

Application filed October 24, 1922. Serial No. 596,567.

*To all whom it may concern:*

Be it known that I, EDWIN W. VOSE, a citizen of the United States, residing at Beverly, in the county of Essex and State of Massachusetts, have invented certain new and useful Improvements in Tail Lamps for Vehicles, of which the following is a specification.

This invention relates to tail lamps for automobiles and the like. The tail lamps now in common use are very easily confused with the red lanterns employed to mark excavations or obstructions in the highway, and this is particularly true when the vision is somewhat obscured by smoke, fog, or the like. Such confusion is a common cause of serious accidents, since a driver approaching a lantern marking an obstruction or excavation is likely to mistake such a lantern for the tail light of a vehicle, and in attempting to pass the supposed vehicle, he drives into the obstruction or excavation. The accidents resulting from this cause have been so numerous that automotive engineers have given serious attention to devising some means for avoiding such accidents. The present invention has for its chief object to devise a tail lamp which will give a light so distinctive that any danger of mistaking it for any other light will be avoided. It is also an object of the invention to improve tail lamp constructions in other respects, particularly with regard to economy of manufacture, properly illuminating the license plate, and the like.

The nature of the invention will be readily understood from the following description when read in connection with the accompanying drawings, and the novel features will be particularly pointed out in the appended claims.

In the drawings,

Figure 1 is a front elevation of a tail light embodying the invention in the form at present preferred;

Fig. 2 is a vertical cross sectional view on the line 2—2, Fig. 1;

Fig. 3 is a horizontal cross sectional view on the line 3—3, Fig. 2; and

Fig. 4 is a rear elevation of a portion of the lens used in the lamp.

The construction shown comprises a lamp housing or casing 2 which is relatively thin in vertical dimensions, is provided with a flat top and bottom, and has a long, narrow opening in the front end thereof. A lamp socket 3 is mounted in the back of this casing and supports an electric lamp 4, both the socket and the lamp being of the ordinary commercial constructions. Secured across the opening in the casing is a lens 5 which is held in place by a bezel 6 fastened to the casing by screws 7—7, the lens being backed up by a gasket or pad 8 of wicking, felt, or other suitable material to keep it from rattling. The end of the casing is shaped to provide a seat for the lens, as clearly shown in the drawings. This lens preferably consists of a plate of red glass having a plain front and a prismatic back. That is, the back of the plate has fine lines cut therein extending vertically, horizontally and diagonally, as shown in Fig. 4, so that they break up the surface into small prisms. This arrangement aids in reducing halation.

The casing 2 is riveted to a bracket 10 having two holes 11—11 in horizontal alinement and two holes 12—12 in vertical alinement punched therethrough, so that the bracket may be bolted to practically any style of tail light holder with which motor vehicles are equipped. Two ears or lugs 14—14 are struck out at an angle from the material of the bracket 10 and have a license plate holder 15 riveted to them, this holder being provided with slots 16—16 so that a license plate P may be conveniently bolted thereto.

For the purpose of transmitting light from the lamp 4 to the license plate P, an aperture or slot 21 is cut through the lower wall of the casing 2 and is closed by a glass plate 22 which is held in place by clips 24—24 riveted to the bottom of the casing.

The socket 3 projects loosely through a hole formed in the back of the casing, the inner flanged end of the socket resting on a spacing collar 18, against which it is drawn firmly by a nut 19 threaded on the metal jacket of the socket. The electrical connection to the socket is protected by the usual insulating ferrule or thimble 20.

Attention is particularly directed to the shape of the opening through which the light is transmitted by the glass plate or lens 5. This opening is long and narrow with its longest dimension disposed horizontally, so that a narrow horizontal band of red light is seen by a person approaching from the rear of the vehicle on which the lamp is mounted. Such a light is so unusual that there is no danger of confusing it, even at a relatively great distance, with a lantern or similar light used to mark an obstruction.

I have found that lenses made in the ordinary geometrical figures, such as squares, triangles, and the like, while easily distinguishable from the ordinary red lantern at a short distance and under favorable conditions, lose their distinguishing characteristics and appear round or circular when seen from a greater distance, or under unfavorable conditions of visibility. But a long narrow horizontal band of light such as is given by the lamp above described, is very readily distinguishable from an ordinary red lantern even at relatively great distances and under exceedingly unfavorable conditions. While the proportions and shape of the light transmitting area of the lens may be varied, I consider it essential for satisfactory results to have this area of substantial width, say at least half an inch, and of a length at least twice as great as its width. It is better to make the width about an inch and the length five or six inches. It is also preferable to use an approximately rectangular form, or at least to have the upper and lower edges of the light transmitting area substantially parallel throughout the greater part of their length. By using a lens of the character described, the shape of the light transmitting opening is sharply defined.

The invention thus provides a tail lamp which throws a beam of light that is so distinctive in appearance that there is no danger of confusing it with the light given by a red lantern or any other ordinary lamp. Furthermore, it retains its distinctive characteristics even when seen from a great distance or under very unfavorable atmospheric conditions.

Attention is also called to the fact that the back of the casing 2 is curved, as best shown in Fig. 3, having approximately the outline of a parabola, and the back wall of the lamp chamber is preferably nickel plated so that it will effectively reflect the rays of light from the lamp 4 through the lens 5 and will distribute the light over approximately the entire surface of the lens. The upper wall of the lamp chamber also has its surface nickel plated so that it will reflect an abundance of light through the aperture 21 to illuminate the license plate P. The inclination of the license plate relatively to the lamp, and the central location of this plate under the lamp, also facilitates, the proper illumination of the plate. The fact that the bottom of the casing is flat makes it possible to use a flat glass plate 22 and thus avoids the expense of a specially shaped glass.

It should be noted that the lamp casing 2, the bracket 10, bezel 6 and holder 15 can all be made from sheet metal by the punch and die process, so that the lamp can be manufactured very economically. At the same time, this method produces a sturdy and substantial construction.

It will be understood that while I have above referred to the plate 5 as a "lens", that this term is used in the ordinary commercial sense rather than in its true or physical sense, although obviously a true lens can be used if desired. The terms "front" and "back" as above applied to the casing, have also been used with reference to the lamp itself, disregarding the fact that the lamp directs its rays backwardly when in use.

While I have herein shown and described the best embodiment of my invention which I have so far devised, it will be appreciated that this embodiment may be modified in minor particulars without departing from the spirit or scope of the invention.

Having thus described my invention, what I desire to claim as new is:

1. A tail lamp for vehicles comprising a lamp casing relatively thin from top to bottom and having a curved rear wall and a long narrow opening in the front of the casing, a colored lens closing said opening, means for removably holding said lens in its operative position, the bottom of said casing being flat and having a long narrow aperture therethrough, a transparent plate closing said aperture, means for holding said plate in said position, a lamp socket mounted in the rear wall of said casing and projecting horizontally therethrough, and an electric lamp mounted in said socket.

2. A tail lamp for vehicles comprising a lamp casing open at its front end, a lens seat surrounding said opening, a lens positioned in said seat, means for removably securing the lens in said seat, said casing being relatively thin from top to bottom and having the rear wall thereof curved to reflect light through said lens, an electric lamp socket mounted in said rear wall, an electric lamp positioned in said socket, a slot formed in the bottom of said casing under said lamp, and a transparent plate closing said slot.

3. A tail lamp for vehicles comprising a lamp casing having openings in the front and bottom thereof, glass plates closing said openings, a lamp socket mounted in the rear wall of said casing, an electric lamp mounted in said socket and positioned to direct its rays through said openings, a bracket riveted to said casing and extending downwardly from the casing, said bracket having ears inclined forwardly, and a license plate holder comprising a slotted bar riveted to said ears.

4. A tail lamp for vehicles comprising a lamp casing, an electric lamp in said casing, a sheet metal bracket riveted to the back of said casing and extending downwardly from the casing, said bracket having holes therethrough arranged in horizontal and vertical alinement whereby the bracket may be secured to lamp holders of different constructions, inclined ears projecting from said bracket, and a license plate holder riveted to said inclined ears, said casing having an opening under said lamp to transmit light on to said license plate.

5. A tail lamp for vehicles comprising a casing having a lamp chamber therein which is relatively thin from top to bottom, said casing having a long narrow light emitting opening in its front end opposite said chamber, a bracket for supporting said casing with said opening in a substantially horizontal position, a lens seat surrounding said opening, a lens positioned in said seat, said lens having a roughened surface adapted to reduce halation, means for removably holding said lens in said seat, a slot in the bottom of said casing, a transparent plate, means for holding said plate in position to close said slot, and a lamp socket mounted in the wall of said casing and adapted to hold an electric lamp, the rear wall of said chamber having a light reflecting surface and being curved to facilitate the reflection of light from said lamp through said lens and to distribute the light over approximately the entire surface of the lens.

6. A tail lamp for vehicles comprising a casing having a lamp chamber therein which is relatively thin from top to bottom, said casing having a long narrow light emitting opening in its front end opposite said chamber, a bracket for supporting said casing with said opening in a substantially horizontal position, a lens closing said opening and having a roughened surface adapted to reduce halation, a lamp socket supported in said casing and adapted to hold an electric lamp, the rear wall of said chamber having a light reflecting inner surface to reflect light from said lamp through said lens and to distribute the light over approximately the entire surface of the lens, a slot in the bottom of said casing, a transparent closure for said slot, and means carried by said bracket for supporting a license plate in a forwardly inclined position below said casing and in a location causing said plate to be illuminated by light transmitted through said slot.

7. A tail lamp for vehicle comprising a lamp casing which is relatively thin from top to bottom and has a long narrow light emitting opening in its front end, a lens seat surounding said opening, a lens positioned in said seat, means for removably holding said lens in said seat, a lamp socket mounted in the wall of said casing and adapted to receive an electric lamp, a slot in the bottom of said casing, a transparent plate closing said slot, and a bracket supporting said casing and having provision for supporting a license plate under said casing in position to be illuminated by light transmitted through said slot, said casing having an inner surface adapted to reflect light from said lamp through said lens.

EDWIN W. VOSE.